United States Patent
Engman et al.

(10) Patent No.: US 9,522,669 B2
(45) Date of Patent: Dec. 20, 2016

(54) METHOD FOR OPTIMIZING THE POWER USAGE OF A VEHICLE

(71) Applicant: VOLVO CAR CORPORATION, Gothenburg (SE)

(72) Inventors: Johan Lars Engman, Alingsas (SE); Rickard Arvidsson, Myggenas (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/323,497

(22) Filed: Jul. 3, 2014

(65) Prior Publication Data

US 2015/0025727 A1    Jan. 22, 2015

(30) Foreign Application Priority Data

Jul. 17, 2013  (EP) .................................... 13176803

(51) Int. Cl.
*B60L 1/00* (2006.01)
*B60W 20/00* (2016.01)
(Continued)

(52) U.S. Cl.
CPC ................. *B60W 20/00* (2013.01); *B60L 1/00* (2013.01); *B60W 10/00* (2013.01); *B60W 10/06* (2013.01);
(Continued)

(58) Field of Classification Search
USPC ............. 701/123, 69, 103, 4, 22–23, 51–53; 903/930; 180/65.21, 65.27, 65.265, 65.29; 713/320; 342/357.74
See application file for complete search history.

(56) References Cited

U.S. PATENT DOCUMENTS

| | | | | |
|---|---|---|---|---|
| 6,672,415 B1 * | 1/2004 | Tabata | ........................ | 180/65.25 |
| 7,028,795 B2 * | 4/2006 | Tabata | ........................ | 180/65.21 |

(Continued)

FOREIGN PATENT DOCUMENTS

| | | | | |
|---|---|---|---|---|
| CN | 104296762 A | * | 1/2015 | ................ B60L 1/00 |
| DE | 102005024403 | | 1/2007 | |

(Continued)

OTHER PUBLICATIONS

Power management strategy for a parallel hybrid electric truck; Chan-Chiao Lin ; Huei Peng ; Grizzle, J.W. ; Jun-Mo Kang Control Systems Technology, IEEE Transactions on; vol. 11 , Issue: 6; DOI: 10.1109/TCST.2003.815606 Publication Year: 2003 , pp. 839-849.*

(Continued)

*Primary Examiner* — Cuong H Nguyen
(74) *Attorney, Agent, or Firm* — Brooks Kushman P.C.

(57) ABSTRACT

A method is provided for optimizing power consumption of a vehicle which may include sending data from a vehicle Electronic Control Unit and vehicle Global Positioning System receiver to a network cloud and/or server upon starting the vehicle, calculating a most probable final destination and most probable optimized route of the vehicle in the network cloud and/or server based on the sent vehicle data, and calculating a most probable driving mode map in the network cloud and/or server. The method may further include calculating an optimized power utilization of propulsion sources for the vehicle in the network cloud and/or server, returning the optimized power utilization of propulsion sources to the vehicle from the network cloud and/or server, and using the optimized power utilization of propulsion sources to control drive train modes and/or peripheral equipment of the vehicle during driving in order to optimize the power consumption of the vehicle.

20 Claims, 3 Drawing Sheets

(51) Int. Cl.

| | |
|---|---|
| *B60W 10/00* | (2006.01) |
| *G01C 21/34* | (2006.01) |
| *B60W 50/00* | (2006.01) |
| *B60W 10/06* | (2006.01) |
| *B60W 10/08* | (2006.01) |
| *B60W 10/10* | (2012.01) |
| *B60W 10/30* | (2006.01) |
| *B60W 30/18* | (2012.01) |
| *G08G 1/0968* | (2006.01) |

(52) U.S. Cl.
CPC .............. *B60W 10/08* (2013.01); *B60W 10/10* (2013.01); *B60W 10/30* (2013.01); *B60W 20/12* (2016.01); *B60W 30/18* (2013.01); *B60W 50/0097* (2013.01); *G01C 21/3407* (2013.01); *G01C 21/3469* (2013.01); *G01C 21/3484* (2013.01); *G08G 1/096811* (2013.01); B60W 2050/0089 (2013.01); B60W 2510/244 (2013.01); B60W 2530/14 (2013.01); B60W 2540/28 (2013.01); B60W 2550/40 (2013.01); B60W 2550/402 (2013.01); B60W 2560/02 (2013.01); Y02T 10/6291 (2013.01); Y02T 10/84 (2013.01); Y10S 903/93 (2013.01)

(56) References Cited

U.S. PATENT DOCUMENTS

| | | | | |
|---|---|---|---|---|
| 7,273,120 | B2* | 9/2007 | Tabata | 180/65.265 |
| 7,925,426 | B2* | 4/2011 | Koebler | B60L 3/12 |
| | | | | 180/65.26 |
| 8,825,243 | B2* | 9/2014 | Yang et al. | 701/22 |
| 9,346,469 | B2* | 5/2016 | Glugla | F02D 41/2432 |
| 9,409,563 | B2* | 8/2016 | Yu | B60L 11/126 |
| 2005/0274553 | A1 | 12/2005 | Salman et al. | |
| 2006/0142915 | A1 | 6/2006 | Isono et al. | |
| 2008/0319596 | A1* | 12/2008 | Yamada | B60K 6/442 |
| | | | | 701/22 |
| 2009/0114463 | A1* | 5/2009 | DeVault | B60K 6/365 |
| | | | | 180/65.29 |
| 2010/0286830 | A1* | 11/2010 | Wijaya | B60H 1/3205 |
| | | | | 700/276 |
| 2011/0066308 | A1* | 3/2011 | Yang et al. | 701/22 |
| 2011/0166731 | A1* | 7/2011 | Kristinsson | B60W 10/08 |
| | | | | 701/22 |
| 2011/0313647 | A1* | 12/2011 | Koebler | B60L 15/2045 |
| | | | | 701/123 |
| 2012/0179319 | A1* | 7/2012 | Gilman | B60W 50/0097 |
| | | | | 701/22 |
| 2013/0179007 | A1* | 7/2013 | Dalum | 701/2 |
| 2013/0253746 | A1* | 9/2013 | Choi | G06Q 50/30 |
| | | | | 701/22 |
| 2013/0332020 | A1* | 12/2013 | Uchihara et al. | 701/22 |
| 2015/0025727 | A1* | 1/2015 | Engman | B60L 1/00 |
| | | | | 701/22 |
| 2015/0127199 | A1* | 5/2015 | Zhao | B60L 11/1862 |
| | | | | 701/22 |
| 2015/0202990 | A1* | 7/2015 | Grossard | B60W 50/0097 |
| | | | | 701/22 |
| 2015/0224997 | A1* | 8/2015 | Glugla | F02D 41/2432 |
| | | | | 701/54 |
| 2015/0365664 | A1* | 12/2015 | Yousefi | H04N 7/183 |
| | | | | 375/240.02 |

FOREIGN PATENT DOCUMENTS

| | | | |
|---|---|---|---|
| DE | 102005035431 | 4/2007 | |
| EP | 2136182 | 12/2009 | |
| EP | 2826688 A1 * | 1/2015 | ............... B60L 1/00 |
| JP | 2000-110709 | * 4/2000 | |
| JP | 2011/053745 | * 8/2013 | |
| WO | 2012072094 | 6/2012 | |

OTHER PUBLICATIONS

Intelligent Hybrid Vehicle Power Control—Part II: Online Intelligent Energy Management; Murphey, Y.L. ; Jungme Park ; Kiliaris, L. ; Kuang, M.L. ; Masrur, M.A. ; Phillips, A.M. ; Qing Wang; Vehicular Technology, IEEE Transactions on; vol. 62 , Issue: 1 DOI: 10.1109/TVT.2012.2217362; Publication Year: 2013 , pp. 69-79.*

Synthesis and validation of representative real-world driving cycles for Plug-In Hybrid vehicles; Tae-Kyung Lee ; Filipi, Z.S. Vehicle Power and Propulsion Conference (VPPC), 2010 IEEE; DOI: 10.1109/VPPC.2010.5729040; Publication Year: 2010 , pp. 1-6.*

Method of battery adjustment for hybrid drive by modeling and simulation; Szumanowski, A. ; Yuhua, C. ; Piorkowski, P. Vehicle Power and Propulsion, 2005 IEEE Conference; DOI: 10.1109/VPPC.2005.1554632; Publication Year: 2005.*

Self-optimizing energy management strategy for fuel-cell/ultracapacitor hybrid vehicles; Chen-Hong Zheng; Wei-Song Lin Connected Vehicles and Expo (ICCVE), 2013 International Conference on; Year: 2013; pp. 87-93, DOI: 10.1109/ICCVE.2013.6799775.*

Cloud-Based Data Analytics Framework for Autonomic Smart Grid Management; Yu Bo Qin; Housell, J.; Rodero, I. Cloud and Autonomic Computing (ICCAC), 2014 International Conference on; Year: 2014; pp. 97-100, DOI: 10.1109/ICCAC.2014.39.*

A Remotely Controlled Onboard Measurement System for Optimization of Energy Consumption of Electrical Trains; Landi, C.; Luiso, M.; Pasquino, N.; Instrumentation and Measurement, IEEE Transactions on; Year: 2008, vol. 57, Issue: 10 pp. 2250-2256, DOI: 10.1109/TIM.2008.922110.*

Cloud-Based Pedestrian Road-Safety with Situation-Adaptive Energy-Efficient Communication; Mehrdad Bagheri; Matti Siekkinen; Jukka K. Nurminen; IEEE Intelligent Transportation Systems Magazine; Year: 2016, vol. 8, Issue: 3; pp. 45-62, DOI: 10.1109/MITS.2016.2573338.*

On-road PHEV power management with hierarchical strategies in vehicular networks; Bingnan Jiang; Yunsi Fei; 2014 IEEE Intelligent Vehicles Symposium Proceedings; Year: 2014; pp. 1077-1084, DOI: 10.1109/IVS.2014.6856597.*

Optimization of energy management system for parallel hybrid electric vehicles using torque control algorithm; Marina Saikyo; Satoshi Kitayama; Yui Nishio; Kojiro Tsutsumi; Society of Instrument and Control Engineers of Japan (SICE), 2015 54th Annual Conference of the; Year: 2015; pp. 1293-1298, DOI: 10.1109/SICE.2015.7285463.*

Neural network and efficiency-based control for dual-mode hybrid electric vehicles; Qi Yunlong; Wang Weida; Xiang Changle Control Conference (CCC), 2015 34th Chinese; Year: 2015 ; pp. 8103-8108, DOI: 10.1109/ChiCC.2015.7260929.*

Work-in-progress: Industry-friendly and native-IP wireless communications for building automation; Zhibo Pang et al., Industrial Networks and Intelligent Systems (INISCom), 2015 1st International Conf. on; Year: 2015, pp. 163-167, DOI: 10.4108/icst.iniscom.2015.258563.*

Extended European Search Report for EP 13176803.8, Completed by the European Patent Office, Dated Dec. 3, 2013, 6 Pages.

* cited by examiner

METHOD FOR OPTIMIZING THE POWER USAGE OF A VEHICLE

CROSS-REFERENCE TO RELATED APPLICATIONS

This application claims foreign priority benefits under 35 U.S.C. §119(a)-(d) to European patent application number EP 13176803.8, filed Jul. 17, 2013, which is incorporated by reference in its entirety.

TECHNICAL FIELD

The disclosure relates to a method for optimizing the power consumption of a vehicle. The vehicle comprises an electronic control unit (ECU), a Global Positioning System (GPS) receiver and communication means for remotely accessing a network cloud and/or server.

BACKGROUND

Driving comfort depends on a multitude of factors, such as vehicle suspension, tire properties, road conditions etc. A relevant factor is whether the vehicle is driven along a smooth road surface or into potholes and across bumps. With potholes is here understood disruptions in the road surface where a portion of the road material has broken away, leaving a hole. With bumps is here understood disruptions in the road surface where a portion of the road is raised, forming an upwardly extending protrusion. If contact with bumps and potholes can be avoided, a perceived driving comfort may be increased.

Presently, the use of vehicles comprising alternate propulsion sources such as electric motors is on the rise. Vehicles may be either pure electric vehicles (EV), hybrid electric vehicles (HEV) or plug-in hybrid electric vehicle (PHEV). The HEV and the PHEV uses more than one power source, i.e. both an internal combustion engine and an electric motor. Environmental and economic concerns have given rise to optimization of the usage of the different propulsion sources in order to reach a more efficient fuel consumption and to reduce emissions from the vehicle.

One example of such an optimization can be found US 2011/0246004. Here the optimization is based on calculating a route which uses the least amount of energy. The calculation is made from energy maps where the energy usage for one or more propulsion source is mapped. Using a start and end point the optimization sends a suitable route to the vehicle.

One problem with the above optimization is that the optimization relies on data collection from probe vehicles which is expensive and time consuming. Further, different probe vehicles have to be used in order to collect data for different vehicle types. Another is that by using energy usage as a means of optimizing the route certain parameters, such as state of charge, may go unused leading to a less efficient optimization.

There is thus a need for an improved optimization method for vehicles.

SUMMARY

The present disclosure relates to a method for optimizing the power consumption of a vehicle. The vehicle comprises an electronic control unit (ECU), a Global Positioning System (GPS) receiver and communication means for remotely accessing a network cloud and/or server. The method comprises:

sending vehicle data from the ECU to the network cloud and/or server upon starting the vehicle;

calculating a most probable final destination and a most probable optimized route of the vehicle in the network cloud and/or server based on the sent vehicle data;

calculating a most probable driving mode map in the network cloud and/or server based on the most probable final destination, the most probable optimized route and the sent vehicle data;

calculating an optimized power utilization of propulsion sources for the vehicle in the network cloud and/or server based on said most probable driving mode map, most probable final destination and most probable optimized route;

returning the optimized power utilization of propulsion sources to the vehicle from the network cloud and/or server, the most probable power utilization of propulsion sources being dependent on the most probable driving mode map, most probable final destination and most probable optimized route of the vehicle;

using the optimized power utilization of propulsion sources to control the drive train modes and/or peripheral equipment of the vehicle during driving in order to optimize the power consumption of the vehicle.

The method allows for an automatic control of a vehicle's drive train modes in order to optimize the power usage of the vehicle. The method focuses on optimizing the power usage of the vehicle instead of the energy consumption. This allows for a better optimization than if the optimization was done based on energy consumption as energy is the integral of power with respect to time. By using power instead of energy the optimization can be performed for in theory infinitesimally small steps of time which thus leads to higher accuracy over time. In practice the power consumption is calculated from data sent to the ECU for small but finite amounts of time. For instance, the GPS coordinates are preferably sent to the ECU at a sample rate of at least 1 Hz. Vehicle data is sent to the ECU with a sample rate of at least 100 Hz. The vehicle data is averaged in the ECU to at least 1 second measurements. The sample rates and averaged measurements are merely intended to illustrate an example and can vary depending on the application. Vehicle data can be sent by any suitable means of communication in a vehicle, such as a Controller Area Network (CAN) bus. The ECU may comprise one or more processors, memory and software for performing any of the associated calculations, functions and/or operations described herein.

The sending of data from the vehicle to the network server and/or cloud can be done by any suitable means. As a result, the communication means for remotely accessing a network cloud and/or server may comprise a mobile communication system or any other suitable communication system. Based on the data sent the vehicle and/or network cloud and/or server predicts the destination and the route that the vehicle will take. For instance a weekday morning the probability is high that the vehicle will travel to the same destination as most other weekday mornings, for example to a place of work via day care. By using a network cloud and/or server the method according to the disclosure can be implemented as algorithms in the cloud and/or server. In that regard, the network cloud and/or server may comprise one or more processors, memory, and software for performing any of the associated calculations, functions and/or operations described herein The method allows for automatic control of a vehicle's drive train modes according to the optimization. The driver may however override the automatic control in order to respond to changing traffic situation or if the driver chooses a different route. These deviations are recorded by the cloud and/or server.

The method may further comprise:
calculating the optimized power utilization of propulsion sources by means of
identifying different routes by starting and ending position and analysis of variance from the vehicle data sent to the network cloud and/or server;
performing a query to collect log-files from the computer cloud and/or server to connect the routes to at least one predetermined route condition;
performing a multiple regression analysis to create a model of the at least one predetermined route condition and power demand;
using dynamic programming to calculate an optimized route based on at least one specific optimization condition;
calculating an optimized power utilization of propulsion sources based on the optimized route;
storing the optimized route in the database;
sending the optimized route and the optimized power utilization of propulsion sources to the vehicle.

The above steps describe in more detail how the optimization is done in the network cloud and/or server.

The at least one predetermined route condition may be chosen from: availability of electric charging stations, availability of fuel stations and speed limit of route segments.

By considering one or more predetermined route conditions the optimization may better optimize the use of the different power sources in the vehicle. By knowing the availability of electric charging stations and fuel stations the optimization may completely discharge the battery of the vehicle if it is known that a charging station is available at the final destination: Similarly, if the locations of fuel stations along the route are known the fuel powering the internal combustion engine can be used up if preferable over the use of the electric engine and the electric engine can be used to power the vehicle to the fuel station. With fuel is meant any combustible fuel used to power an internal combustion engine.

The at least one specific optimization condition may be chosen from: time optimization, cost optimization, CO2 emission optimization, NOx emission optimization, fuel level optimization, total energy consumption optimization and maximum power utilization optimization.

The method may be used in conjunction with a number of different optimization conditions.

Optimization with respect to time relates to minimizing the driving time.

Optimization with respect to cost relates to the total driving cost for the specific distance. This may be used to change the drive mode of the vehicle depending on whether using fuel is more expensive than using electricity and recharging the battery or vice versa.

Optimization with respect to CO2 emission optimization may be used to change the drive mode of the vehicle with respect to the overall CO2 emission of the vehicle. If for instance the vehicle uses a fuel from a renewable source such as ethanol or similar and the electricity available for recharging the battery comes from coal power plants it may be more CO2 efficient to use the internal combustion engine. The same applies for optimization with respect to NOx emissions.

Optimization with respect to fuel level optimization may relate to setting a target for the fuel remaining at the arrival at the final destination. This may be useful for when it is known that future distances to be travelled do not contain fuel stations and/or electric charging stations.

Optimization with respect to total energy consumption relate to minimizing the energy used for the specific distance.

Optimization with respect to maximum power utilization relates to using the vehicle such that the maximum amount of power is available at all times. This may be useful for instance when driving off-road or in other types of difficult terrain.

One or more of these conditions may be combined to allow for more advanced optimization conditions. As is obvious some of the optimization conditions contradict each other. Either the algorithms used by the method or the driver may choose which condition that is to be the dominating one.

The vehicle data may comprise at least one of: Start position from the GPS receiver, time of day and date, driver identification, vehicle identification, state of charge level of battery, ambient temperature, engine temperature, interior temperature, fuel level and possibility of charging from grid at final destination.

By using one or more of the above vehicle data the method receives a number of parameters, which can be used to better calculate the various predictions and optimizations of the method.

Apart from the algorithms, vehicle and driver data can be uploaded to the cloud and/or server in order for the algorithms to be self-learning. By using data from multiple instances of the use of a specific vehicle driving a specific distance and storing the data from those instances in the cloud and/or server the algorithm may constantly optimize the power consumption for a specific vehicle for a specific distance. Using data from other vehicles driving a specific distance enables the method to be used for a specific vehicle, although that specific vehicle has never driven that specific distance before. In the later case the optimization for the specific vehicle driving the specific distance for the first time is based on the data sent and stored into the cloud and/or server of other vehicles that have driven that specific distance.

The drive train modes selectable during control of the vehicle may be one or more of: Hybrid mode with or without active recuperation, mixed mode, pure electric drive mode, pure additional propulsion source mode, pure internal combustion engine mode, save for later, gear selection/dynamic shift points for internal combustion engine, gear selection/dynamic shift points for electric motor, gear selection/dynamic shift points for at least one additional propulsion source, neutral freewheeling for an internal combustion source and/or electric motor and/or at least one additional propulsion source, internal combustion engine engaged or disengaged, discharge strategy for the battery, state of charge target, disengage additional propulsion source to avoid drag losses in drive train and deciding status of engine operating mode. The method may be applied both to vehicles having only one type of propulsion source and to vehicles having more than one propulsion source. The number of the above mentioned drive train modes available are adapted depending on the number of propulsion sources in the vehicle.

The various above mentioned drive train modes describe the ways the vehicle may be controlled by the method. With additional propulsion source mode is meant for instance any type of kinetic energy recovery system (KERS). By using the above mentioned various drive train modes certain advantageous effects can be achieved. It is for instance possible to ensure that the battery of an EV, HEV or PHEV can be charged for instance during breaking or when the internal combustion engine is used. By using appropriate modes the risk of overcharging the battery can be reduced or removed altogether. The battery can also be completely drained during a part of the distance travelled it the optimized route contains part where the battery can be recharged again. It is also possible to ensure that the battery is optimally charged when reaching the final destination. Optimal charging can be completely drained if there is a charging station at the final destination or a charge level higher than 0 if there is no charging station at the final destination.

The driver identification may comprise one or more of:
identifying the mobile phone of the driver via the Bluetooth connection
identifying the driver via camera and facial recognition software incorporated in the ECU
identification of the driver key
finger print recognition.

By using driver identification the method may connect not only the vehicle to the method but also the driver. This allows for that the predictions and optimizations made by the method still may be viable as a driver buys a new car or when a driver borrows a car during a period of time. The driver identification may comprise identification of the mobile phone of the driver of via the Bluetooth connection between the telephone and the car's ECU. When multiple telephones are present it is possible for the driver to select which one that is his in order to obtain a correct driver recognition. The driver identification may further comprise identification of the driver via a camera and facial recognition software incorporated in the ECU. This can be made by any known method available today. Driver identification may further comprise identification of the driver key. In the case of a driver borrowing a car and no other means of identification are available the driver may enter a driver ID, such as his name, a username or user number or another identifier, into the vehicle's ECU via any suitable input device for correct identification. Driver identification may also comprise finger print recognition from a fingerprint scanner located in a suitable position.

The peripheral equipment may be one or more of: Air conditioner, electrically controlled windows, electrically controlled chairs, and thermos for storage of excess heat.

The method may be used to control the peripheral equipment of the vehicle in order to further optimize one or more of the above mentioned optimization conditions. For instance peripheral equipment may be switched off in order to preserve fuel or electric power. Peripheral equipment may also be used to cool or heat the car depending on the time of year and time of day. For instance, the method predicts that the car will be used to drive to work on a weekday morning with a starting time the same as the day before. A predetermined time before the starting time the car may use the air conditioning system to bring the car to a suitable temperature for the driver such that the driver does not need time to bring the car to a suitable temperature before driving away. Also excess heat from the vehicle may be stored in for instance a thermos or other heat storing unit to be used later when additional heat may be needed. This means that the air conditioning unit does not have to provide the additional heat and the total power needed can be reduced.

Information from the vehicle during driving of a route may be uploaded to the network cloud and/or server in order to create a log file of the route taken by the vehicle in order to improve the calculation of the optimized power utilization of propulsion sources.

By constantly uploading information from the vehicle new log files are created that describe the driving conditions and vehicle behaviour for a specific distance. Each new log file is can be used by the algorithm in order to improve the calculation of the optimized power utilization of propulsion sources. Further, the more log files that is recorded for a specific distance the better the optimization will be for a vehicle that has never driven the distance before.

The disclosure further relates to a vehicle comprising an electronic control unit (ECU), a GPS receiver and communication means for remotely accessing a network cloud and/or server. The drive train modes and/or peripheral equipment of the vehicle may be controllable according to the method described above.

The disclosure further relates to a system for optimizing the power consumption of a vehicle, the system comprising a vehicle and a network cloud/server, the vehicle comprising electronic control unit (ECU), a GPS receiver and communication means for remotely accessing a network cloud and/or server, characterized in that the drive train modes and/or peripheral equipment of the vehicle is controllable and in that the network cloud/server comprises algorithms used to calculate an optimized power consumption for the vehicle for controlling the drive train modes and/or peripheral equipment of the vehicle.

The disclosure is also compatible with maps of environmental zones or similar where it is forbidden to use the internal combustion engine powered by fossil fuel. This is taken into account when optimizing the power consumption of the vehicle thereby disallowing the driver to use the internal combustion engine in these zones.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

As required, detailed embodiments of the present disclosure are disclosed herein. However, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
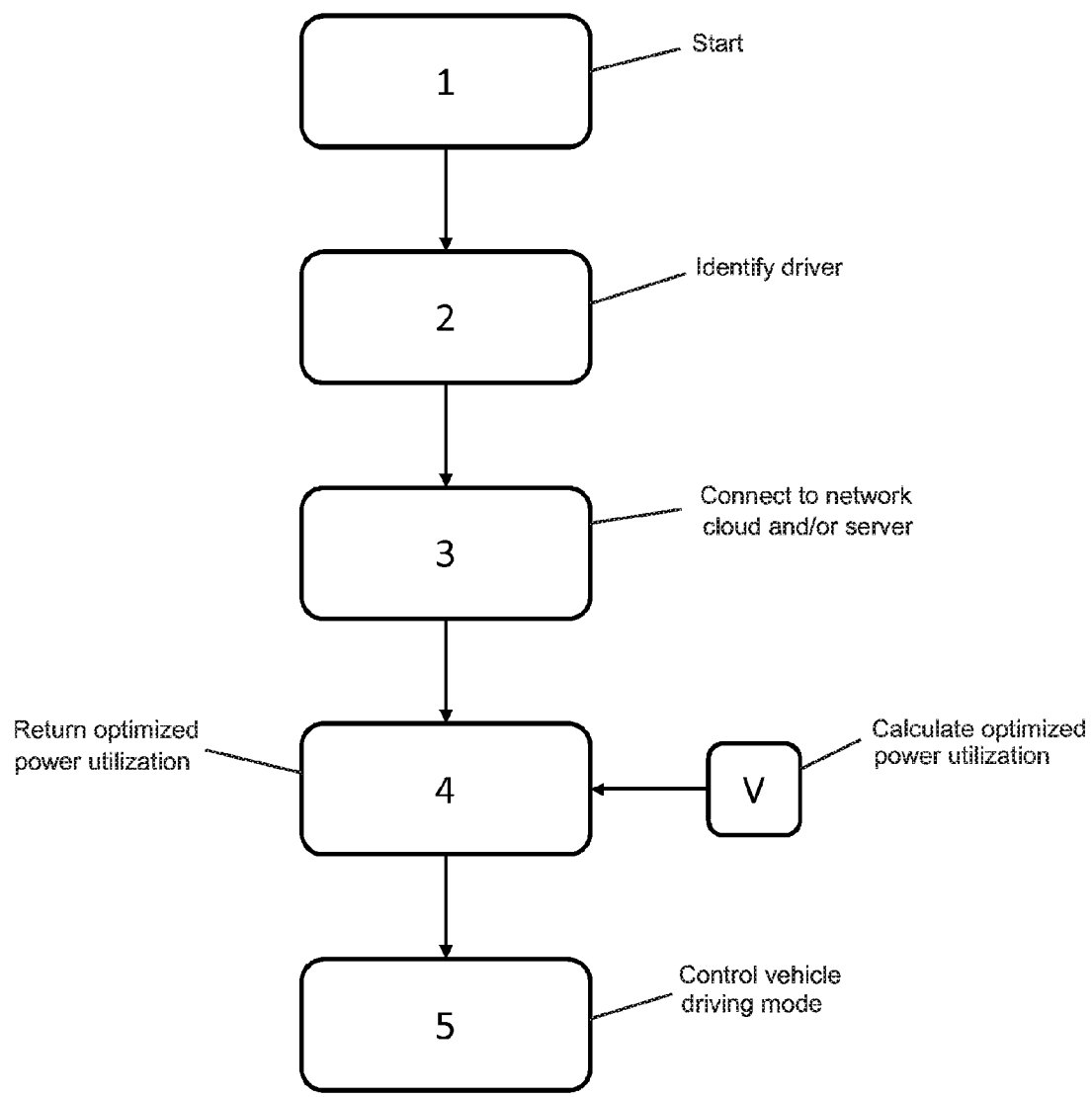
FIG. 1 schematically shows the start-up procedure cloud control for a method according to the disclosure.

FIG. 1 schematically shows the start-up procedure cloud control for a method according to the disclosure. In FIG. 1 the method steps are illustrated by boxes 1-5.

In box 1 the system starts to set up when the vehicle starts.

In box 2 the driver is identified. This is achieved as described above by means of identification of the mobile phone of the driver via the Bluetooth connection, identification of the driver via a camera and facial recognition software incorporated in the ECU and/or identification of the driver key.

In box 3 the vehicle connects to the network cloud and/or server and sends the information to the cloud in order for the algorithms in the cloud to be able to calculate a most probable final destination and a most probable optimized route of the vehicle based on the sent vehicle data. The cloud and/or network further calculates a most probable driving mode map based on the most probable final destination, the most probable optimized route and the sent vehicle data. The cloud and/or network further calculates an optimized power utilization of propulsion sources for the vehicle based on said most probable driving mode map, most probable final destination and most probable optimized route.

In box 4 the cloud returns the optimized power utilization of propulsion sources. The optimized power utilization of propulsion sources may contain the most probable final destination, the most probable optimized route to the final destination and the most probable driving mode map for each GPS location along the most probable optimized route. The input in box 4 comes from a calculation made in box V of FIG. 2 described below.

In box 5 the optimized power utilization of propulsion sources returned to the vehicle in box 4 is used to control the driving mode of the vehicle during driving.

Figure 2:
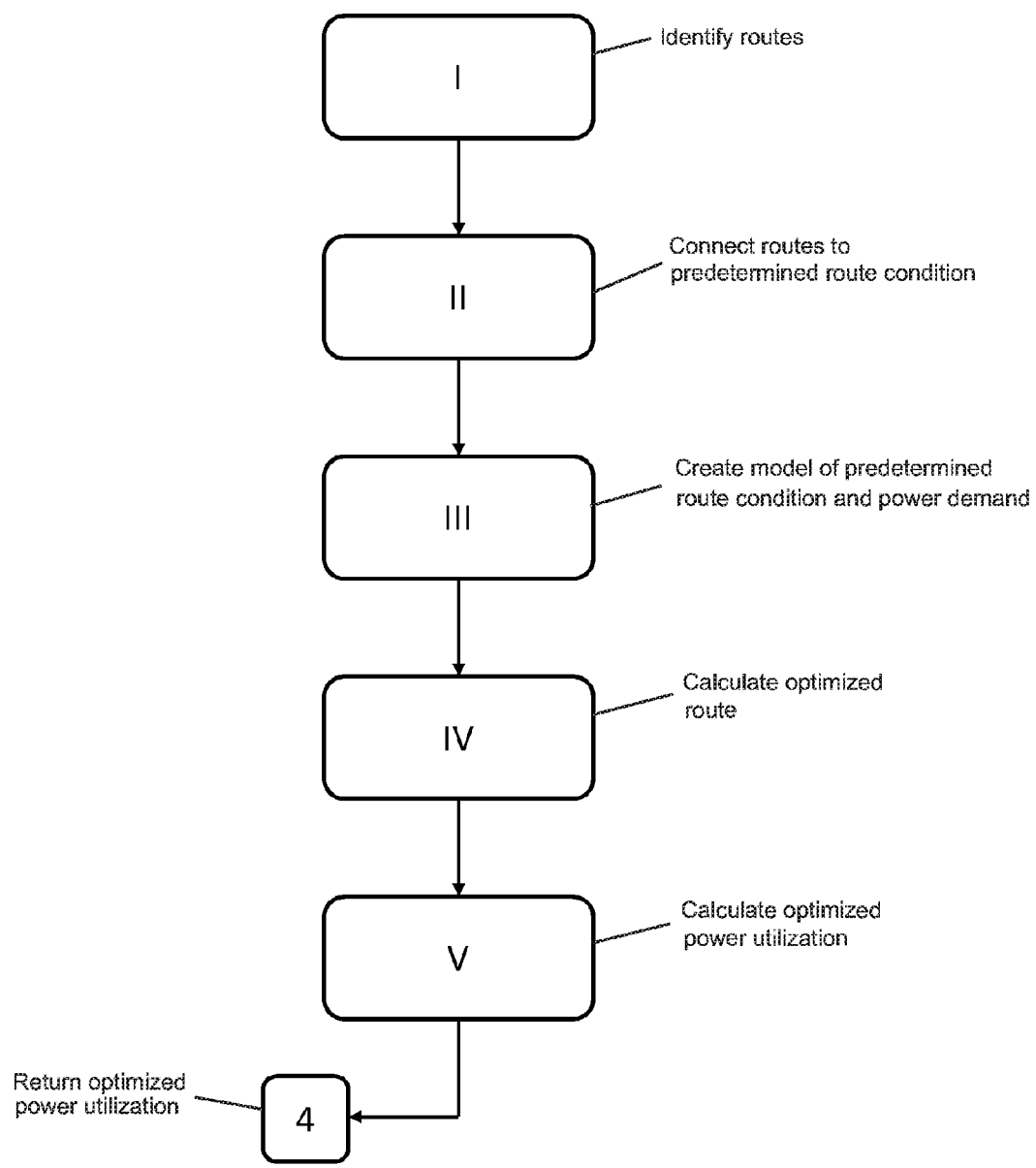
FIG. 2 schematically shows the cloud computed tasks according to an aspect of the disclosure.

FIG. 2 schematically shows the cloud computed tasks according to an aspect of the disclosure. In one aspect of the disclosure the calculations done in the cloud and/or server is done according to the method steps in the boxes I-V.

In box I different routes are identified by starting and ending position and analysis of variance from the vehicle data sent to the network cloud and/or server.

In box II a query to collect log-files from the computer cloud and/or server is performed to connect the routes to at least one predetermined route condition.

In box III a multiple regression analysis is performed to create a model of the at least one predetermined route condition and power demand.

In box IV dynamic programming is used to calculate an optimized route based on at least one specific optimization condition.

In box V an optimized power utilization of propulsion sources is calculated based on the optimized route. The optimized route is stored in the database. The optimized route and the optimized power utilization of propulsion sources are sent to the vehicle. This optimized power utilization of propulsion sources is entered into method step 4 of the method described in FIG. 1.

Reference signs mentioned in the claims should not be seen as limiting the extent of the matter protected by the claims, and their sole function is to make claims easier to understand.

Figure 3:
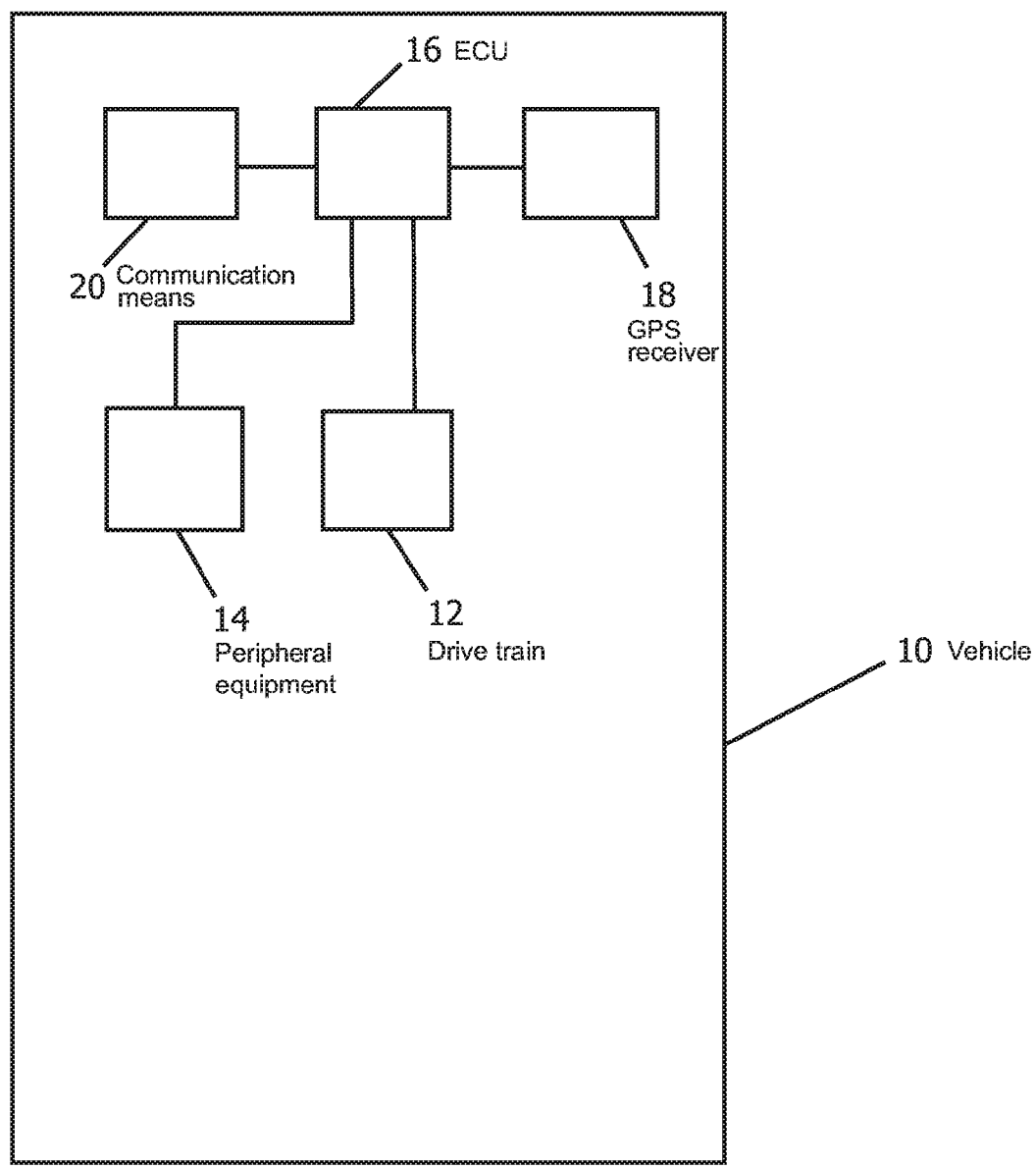
FIG. 3 shows a vehicle wherein a drive train mode and/or peripheral equipment of the vehicle may be controllable according to one or more of the embodiments disclosed herein.

FIG. 3 shows a vehicle 10 having a drive train 12 and/or peripheral equipment 14. The peripheral equipment 14 and/or a mode of the drive train 12 may be controllable according to one or more of the embodiments disclosed herein. As seen in FIG. 3, the vehicle 10 may comprise an Electronic Control Unit (ECU) 16, a Global Positioning System (GPS) receiver 18, and communication means 20 for remotely accessing a network cloud and/or server as previously described.

As will be realised, the disclosure is capable of modification in various obvious respects, all without departing from the scope of the appended claims. Accordingly, the drawings and the description thereto are to be regarded as illustrative in nature, and not restrictive.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for optimizing the power consumption of a vehicle, the vehicle comprising at least an electronic control unit (ECU), a Global Positioning System (GPS) receiver and a mobile communication system for remotely accessing a network cloud and/or server, the method comprising:
   sending vehicle data from the GPS receiver and the ECU to the network cloud and/or server upon starting the vehicle;
   calculating a most probable final destination and a most probable optimized route of the vehicle in the network cloud and/or server based on the sent vehicle data;
   calculating a most probable driving mode map in the network cloud and/or server based on the most probable final destination, the most probable optimized route and the sent vehicle data;
   calculating an optimized power utilization of propulsion sources for the vehicle in the network cloud and/or server based on said most probable driving mode map, most probable final destination and most probable optimized route;
   returning the optimized power utilization of propulsion sources to the vehicle from the network cloud and/or server, the most probable power utilization of propulsion sources being dependent on the most probable driving mode, most probable final destination and most probable optimized route of the vehicle; and
   using the optimized power utilization of propulsion sources to control the drive train modes and/or peripheral equipment of the vehicle during driving in order to optimize the power consumption of the vehicle.

2. The method of claim 1 further comprising:
   calculating the optimized power utilization of propulsion sources by
      identifying different routes by starting and ending position and analysis of variance from the vehicle data sent to the network cloud and/or server;
      performing a query to collect log-files from the computer cloud and/or server to connect the routes to at least one predetermined route condition;
      performing a multiple regression analysis to create a model of the at least one predetermined route condition and power demand;
      using dynamic programming to calculate an optimized route based on at least one specific optimization condition;
      calculating an optimized power utilization of propulsion sources based on the optimized route;
      storing the optimized route in the database; and
      sending the optimized route and the optimized power utilization of propulsion sources to the vehicle.

3. The method of claim 2, wherein the at least one predetermined route condition is chosen from availability of electric charging stations, availability of fuel stations and speed limit of route segments.

4. The method of claim 2, wherein the at least one specific optimization condition is chosen from time optimization, cost optimization, CO2 emission optimization, NOx emission optimization, fuel level optimization, total energy consumption optimization and maximum power utilization optimization.

5. The method of claim 1, wherein the vehicle data comprises at least one of Start position from the GPS receiver, time of day and date, driver identification, vehicle identification, state of charge level of battery, ambient temperature, engine temperature, interior temperature, fuel level and possibility of charging from grid at final destination.

6. The method of claim 1, wherein the drive train modes selectable during control of the vehicle are one or more of Hybrid mode with or without active recuperation, mixed mode, pure electric drive mode, pure additional propulsion source mode, pure internal combustion engine mode, eAWD, save for later, gear choosing for internal combustion engine, gear choosing for electric motor, gear choosing for additional propulsion source, neutral, freewheeling, internal combustion engine engaged or disengaged, discharge strategy for the battery, state of charge target, disengage additional propulsion source to avoid drag losses in drive train.

7. The method of claim 5, wherein the driver identification comprises one or more of:
  identifying the mobile phone of the driver via the Bluetooth connection;
  identifying the driver via camera and facial recognition software incorporated in the ECU; and
  identification of the driver key.

8. The method of claim 1, wherein the peripheral equipment is one or more of Air conditioner, electrically controlled windows, electrically controlled chairs, and thermos for storage of excess heat.

9. The method of claim 2, wherein information from the vehicle during driving of a route is uploaded to the network cloud and/or server in order to create a log file of the route taken by the vehicle in order to improve the calculation of the optimized power utilization of propulsion sources.

10. A vehicle comprising an electronic control unit (ECU), a Global Positioning System (GPS) receiver and a mobile communication system for remotely accessing a network cloud and/or server, wherein the vehicle is configured for cooperation with the network cloud and/or server to
  send vehicle data from the GPS receiver and the ECU to the network cloud and/or server upon starting the vehicle;
  calculate a most probable final destination and a most probable optimized route of the vehicle in the network cloud and/or server based on the sent vehicle data;
  calculate a most probable driving mode map in the network cloud and/or server based on the most probable final destination, the most probable optimized route and the sent vehicle data;
  calculate an optimized power utilization of propulsion sources for the vehicle in the network cloud and/or server based on said most probable driving mode map, most probable final destination and most probable optimized route;
  return the optimized power utilization of propulsion sources to the vehicle from the network cloud and/or server, the most probable power utilization of propulsion sources being dependent on the most probable driving mode, most probable final destination and most probable optimized route of the vehicle; and
  use the optimized power utilization of propulsion sources to control the drive train modes and/or peripheral equipment of the vehicle during driving in order to optimize the power consumption of the vehicle.

11. A system for optimizing the power consumption of a vehicle, the system comprising:
  a network cloud and/or server for communicating with a vehicle comprising at least an electronic control unit (ECU), a Global Positioning System (GPS) receiver and a mobile communication system for remotely accessing the network cloud and/or server, the vehicle having a controllable drive train mode and/or controllable peripheral equipment;
  wherein the network cloud and/or server receives vehicle data from the ECU and GPS receiver, and wherein the network cloud and/or server comprises algorithms used to calculate an optimized power consumption for the vehicle based on the received vehicle data, the calculated optimized power consumption for use in controlling the drive train mode and/or peripheral equipment of the vehicle.

12. A method for optimizing the power consumption of a vehicle, the vehicle comprising at least an electronic control unit (ECU), a Global Positioning System (GPS) receiver and a mobile communication system for remotely accessing a network cloud and/or server, the method comprising:
  receiving vehicle data from the GPS receiver and the ECU in the network cloud and/or server upon starting the vehicle;
  calculating a most probable final destination and a most probable optimized route of the vehicle in the network cloud and/or server based on the sent vehicle data;
  calculating a most probable driving mode map in the network cloud and/or server based on the most probable final destination, the most probable optimized route and the sent vehicle data;
  calculating an optimized power utilization of propulsion sources for the vehicle in the network cloud and/or server based on said most probable driving mode map, most probable final destination and most probable optimized route; and
  returning the optimized power utilization of propulsion sources to the vehicle from the network cloud and/or server, the most probable power utilization of propulsion sources being dependent on the most probable driving mode, most probable final destination and most probable optimized route of the vehicle;
  wherein the optimized power utilization of propulsion sources is for use by the vehicle to control the drive train modes and/or peripheral equipment of the vehicle during driving in order to optimize the power consumption of the vehicle.

13. The method of claim 12 further comprising:
calculating the optimized power utilization of propulsion sources by
  identifying different routes by starting and ending position and analysis of variance from the vehicle data sent to the network cloud and/or server;
  performing a query to collect log-files from the computer cloud and/or server to connect the routes to at least one predetermined route condition;
  performing a multiple regression analysis to create a model of the at least one predetermined route condition and power demand;
  using dynamic programming to calculate an optimized route based on at least one specific optimization condition;
  calculating an optimized power utilization of propulsion sources based on the optimized route;

storing the optimized route in the database; and
sending the optimized route and the optimized power utilization of propulsion sources to the vehicle.

14. The method of claim 13, wherein the at least one predetermined route condition is chosen from availability of electric charging stations, availability of fuel stations and speed limit of route segments.

15. The method of claim 13, wherein the at least one specific optimization condition is chosen from time optimization, cost optimization, CO2 emission optimization, NOx emission optimization, fuel level optimization, total energy consumption optimization and maximum power utilization optimization.

16. The method of claim 12, wherein the vehicle data comprises at least one of Start position from the GPS receiver, time of day and date, driver identification, vehicle identification, state of charge level of battery, ambient temperature, engine temperature, interior temperature, fuel level and possibility of charging from grid at final destination.

17. The method of claim 12, wherein the drive train modes selectable during control of the vehicle are one or more of Hybrid mode with or without active recuperation, mixed mode, pure electric drive mode, pure additional propulsion source mode, pure internal combustion engine mode, eAWD, save for later, gear choosing for internal combustion engine, gear choosing for electric motor, gear choosing for additional propulsion source, neutral, freewheeling, internal combustion engine engaged or disengaged, discharge strategy for the battery, state of charge target, disengage additional propulsion source to avoid drag losses in drive train.

18. The method of claim 12, wherein the peripheral equipment is one or more of Air conditioner, electrically controlled windows, electrically controlled chairs, and thermos for storage of excess heat.

19. The method of claim 13, wherein information from the vehicle during driving of a route is uploaded to the network cloud and/or server in order to create a log file of the route taken by the vehicle in order to improve the calculation of the optimized power utilization of propulsion sources.

20. A vehicle comprising an electronic control unit (CU), a Global Positioning System (GPS) receiver and a mobile communication system for remotely accessing a network cloud and/or server, wherein the vehicle is configured for cooperation with the network cloud and/or server to receive vehicle data from the GPS receiver and the ECU in the network cloud and/or server upon starting the vehicle;

calculate a most probable final destination and a most probable optimized route of the vehicle in the network cloud and/or server based on the sent vehicle data;

calculate a most probable driving mode map in the network cloud and/or server based on the most probable final destination, the most probable optimized route and the sent vehicle data;

calculate an optimized power utilization of propulsion sources for the vehicle in the network cloud and/or server based on said most probable driving mode map, most probable final destination and most probable optimized route; and return the optimized power utilization of propulsion sources to the vehicle from the network cloud and/or server, the most probable power utilization of propulsion sources being dependent on the most probable driving mode, most probable final destination and most probable optimized route of the vehicle;

wherein the optimized power utilization of propulsion sources is for use by the vehicle to control the drive train modes and/or peripheral equipment of the vehicle during driving in order to optimize the power consumption of the vehicle.

* * * * *